(12) United States Patent
Rathod

(10) Patent No.: US 8,983,957 B2
(45) Date of Patent: *Mar. 17, 2015

(54) METHOD OF OPERATING A REPOSITORY FOR THREE-DIMENSIONAL PRINTING DATA

(71) Applicant: Imaginestics, LLC, West Lafayette, IN (US)

(72) Inventor: Nainesh Rathod, West Lafayette, IN (US)

(73) Assignee: Imaginestics, LLC, West Lafayette, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/214,237

(22) Filed: Mar. 14, 2014

(65) Prior Publication Data

US 2014/0222859 A1 Aug. 7, 2014

Related U.S. Application Data

(63) Continuation-in-part of application No. 13/758,344, filed on Feb. 4, 2013.

(60) Provisional application No. 61/793,449, filed on Mar. 15, 2013.

(51) Int. Cl.
G06F 17/30 (2006.01)
G06Q 30/06 (2012.01)
G06Q 50/04 (2012.01)

(52) U.S. Cl.
CPC ...... *G06F 17/30424* (2013.01); *G06Q 30/0625* (2013.01); *G06Q 30/0603* (2013.01); *G06Q 30/0643* (2013.01); *G06Q 50/04* (2013.01)

USPC .......................................... 707/736; 707/783

(58) Field of Classification Search
None
See application file for complete search history.

(56) References Cited

U.S. PATENT DOCUMENTS

| 7,660,738 B1 * | 2/2010 | Siegel et al. ..................... 705/20 |
| 2004/0010486 A1 * | 1/2004 | MacQueen et al. ............... 707/1 |
| 2005/0289131 A1 * | 12/2005 | Aenlle et al. ...................... 707/3 |
| 2007/0282670 A1 * | 12/2007 | Repasi et al. ................... 705/10 |

FOREIGN PATENT DOCUMENTS

WO WO2007101114 * 9/2007 ............. G06F 17/30

* cited by examiner

*Primary Examiner* — Son T Hoang
(74) *Attorney, Agent, or Firm* — Keith J. Swedo; Bingham Greenebaum Doll LLP

(57) ABSTRACT

A method of providing a 3D printing database includes collecting 3D printing data from a plurality of users to form a 3D printing database. A first exclusive group is formed including a first subset of the users. Users who are members of the exclusive group are provided with access to a first portion and to other portions of the 3D printing database. The first portion is contributed to the database by the users who are members of the exclusive group. Users excluded from the exclusive group are denied access to the first portion of the component part database. The users excluded from the exclusive group are provided with access to the other portions of the 3D printing database. Each of the users is enabled to furnish an image of a desired component part and to search only the portions of the 3D printing database to which the user has been provided access. The searching is based upon the furnished image of the desired component part.

10 Claims, 5 Drawing Sheets

METHOD OF OPERATING A REPOSITORY FOR THREE-DIMENSIONAL PRINTING DATA

RELATED APPLICATIONS

This application claims the benefit of U.S. Provisional Application 61/793,449 filed Mar. 15, 2013, and is a continuation-in-part of U.S. application Ser. No. 13/758,344 filed Feb. 4, 2013 each of which is hereby incorporated by reference herein.

FIELD OF THE INVENTION

In one embodiment, the invention may be applied to operating a repository or database of three-dimensional printing data.

BACKGROUND

Additive manufacturing or three-dimensional (3D) printing is a process of making a three-dimensional solid object of almost any shape based on a digital model. Three-dimensional printing is performed using an additive process, wherein successive layers of material are laid down on top of each other in different shapes. In this way, three-dimensional printing is different from traditional machining methods wherein material is removed via subtractive processes such as cutting or drilling.

SUMMARY OF THE PRESENT INVENTION

The present invention may provide a method of operating a repository of data used in 3D printing. In one embodiment, the present invention provides a computer networking system that enables users to share with each other a database of 3D printing data that the users may need to manufacture certain components. Some users may only contribute 3D printing data to the database, other users may only retrieve 3D printing data from the database, and other users may both contribute 3D printing data to the database and retrieve 3D printing data from the database. Some users may only be potential manufacturers of parts and may not have any of their own 3D printing data to provide. Other users may only be designers of parts, or may convert data defining parts into 3D printing data. Other users may both manufacture parts using 3D printing data and create 3D printing data.

An owner or operator of the 3D printing database may sell or otherwise provide access to the 3D printing data to users. For example, users who have a subscription or who purchase a license to use the 3D printing data associated with a particular component may obtain a license to and receive the 3D printing data. The license may allow the user to use the 3D printing data for as long as they wish, or only for a certain or pre-defined period of time. The software in which the 3D printing data is embedded may prevent access to the data after the certain or pre-defined period of time has expired.

In another embodiment, the license allows the user to use the 3D printing data only a certain number of times, either with a time limit or without a time limit to use the data. A security function in the data may prevent the user from using the data to print the part more than the number of times that the user paid for.

The owner or operator of the 3D printing database may validate the 3D printing data contributed to the database, and may sell users a warranty for the validated 3D printing data. The validation may include the owner/operator manufacturing a part by use of the 3D printing data and testing the part to ensure that it has no defects. Alternatively, the owner may receive verification from a prior purchaser/licensee of the 3D printing data who informs the owner that the purchaser/licensee successfully used the 3D printing data to manufacture acceptable parts.

Each user may control which of the other users have access to the data associated with that user's contributed 3D printing data. The users may form exclusive groups wherein each member of the group approves the inclusion of each of the other members, and each member is given access to the 3D printing data provided by each of the other members. Other members of the community who are not in the exclusive group would be denied access to the common 3D printing data associated with the exclusive group. Each member of such an exclusive group may have a contractual relationship to create 3D printing data and/or produce a certain end product by use of the 3D printing data. Alternatively, or in addition, each member of such an exclusive group may represent a different step in a complex manufacturing process to provide a certain end product.

Although excluded community members who have not been approved by the exclusive group members for inclusion in the exclusive group may not have access to the common 3D printing data of the exclusive group, individual members of the exclusive group may provide an excluded member with access to that individual member's 3D printing data.

The users of the community may utilize a search engine to search for 3D printing data that matches the image that a searcher may provide. For example, a user who is searching for 3D printing data for a desired part may provide a two- or three-dimensional doodle (e.g., mouse-drawn sketch), two-dimensional drawing, three-dimensional model, or any type of two-dimensional images or pictures.

Product manufacturers that own intellectual property in the form of a proprietary product design can upload their product designs to an online platform. Such product designs may contain 3D models that have been validated to work well on an additive/3D printer or any other manufacturing machine. This product design data may be encrypted and securely coded with a key in the company's vPage (i.e., visual page) on the online platform. A vPage may be a page that is associated with and dedicated to the company on the online platform. The platform may be a means for the manufacturer to distribute/sell its product design directly to the end user. The end user may pay for the product design via the online platform and download or stream the product design so that the end user may print the product on a certified printer/machine once or multiple times, depending on how many products the end user wants to produce.

The invention comprises, in one form thereof, a method of providing a searchable database of 3D printing data, including collecting 3D printing data from a plurality of users to form a 3D printing database. An exclusive group is formed including a subset of the users. User members of the exclusive group are provided with access to the 3D printing data contributed to the database by other user members of the exclusive group. Users excluded from the exclusive group are denied access to the 3D printing data contributed to the database by the user members of the exclusive group. The user members in the exclusive group are enabled to provide images of desired component parts and to search the 3D printing database based upon the images of desired component parts.

The invention comprises, in one form thereof, a method of providing a searchable database, including collecting 3D printing data associated with component parts and services related to the component parts from a plurality of users to form a database. A first exclusive group including a first subset of the users is formed. Users who are members of the exclusive group are provided with access to a first portion and to other portions of the database. The first portion is contributed to the database by the users who are members of the exclusive group. Users excluded from the exclusive group are denied access to the first portion of the database. Users excluded from the exclusive group are provided with access to the other portions of the database. A second exclusive group is formed including a second subset of the users. The second subset includes at least one but not all members of the first subset and at least one but not all of the users excluded from the first subset. Users who are members of the second exclusive group are provided with access to a second portion of the database. The second portion is contributed to the database by the users who are members of the second exclusive group. Users excluded from the second exclusive group are denied access to the second portion of the database. The users excluded from the second exclusive group are provided with access to the other portions of the database. Each of the users is enabled to furnish an image of a desired component part and a keyword description of a service related to the component part. Each of the users is enabled to select one of the desired component part and a keyword description to be a primary search term and the other to be a secondary search term. Each of the users is enabled to search only the portions of the database to which the user has been provided access. The searching is based upon the furnished image of the desired component part and the keyword description of the related service, and is dependent upon the selection of the primary search term and the secondary search term.

An advantage of the invention is that it may eliminate the need for product distribution by enabling the customer to online-shop for, gain use and manufacturing rights to the desired product, and produce the desired product themselves.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The embodiments hereinafter disclosed are not intended to be exhaustive or limit the invention to the precise forms disclosed in the following description. Rather the embodiments are chosen and described so that others skilled in the art may utilize its teachings.

Figure 1:
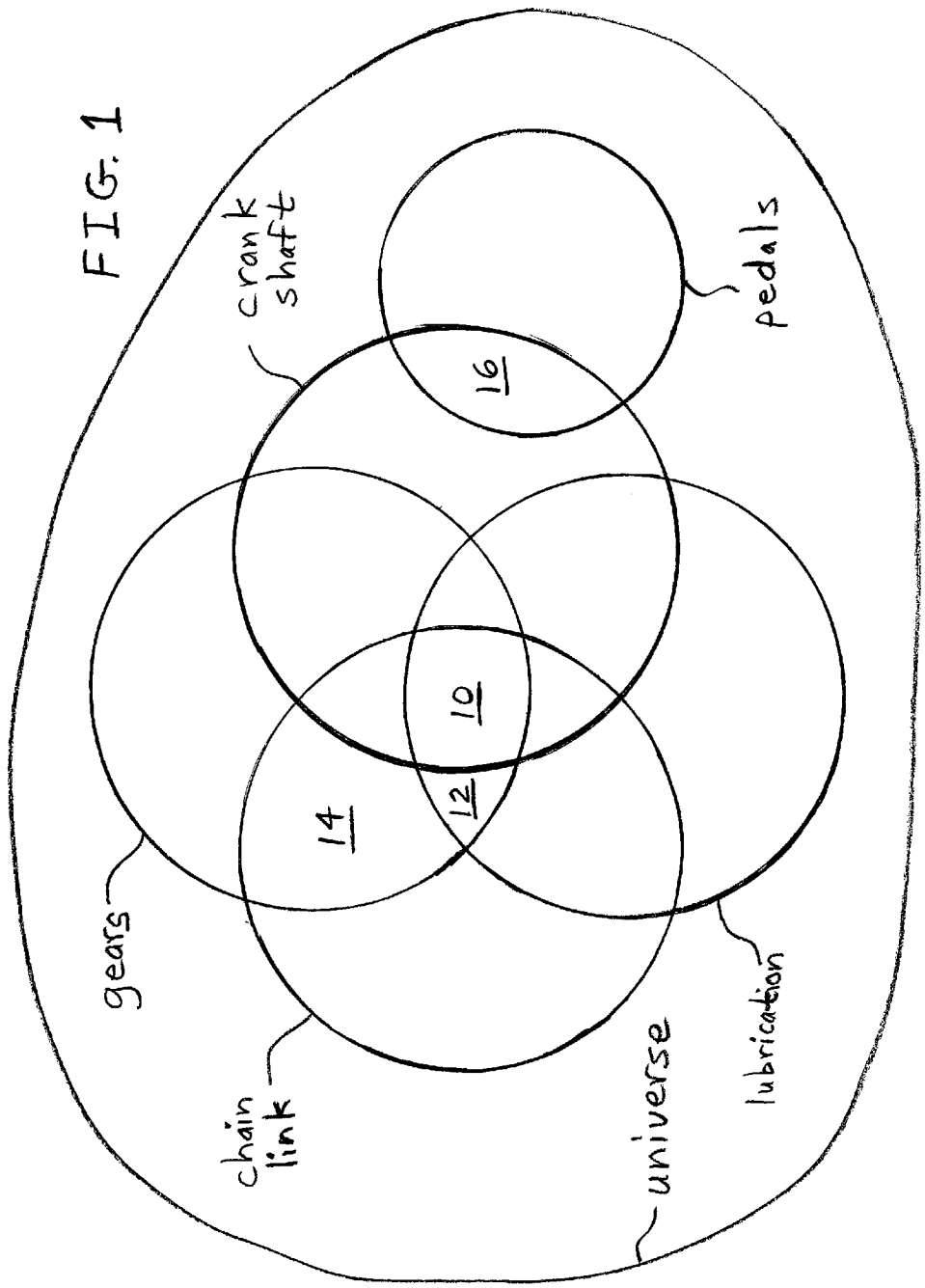
FIG. 1 is a diagram of shared data groupings in one embodiment of a shared database system of the present invention.

Referring now to FIG. 1, there is shown a diagram of a database divided into a plurality of exclusive groupings according to one embodiment of the present invention. A database, or "universe," of component part data is collected from a plurality of users, only a selected few of the users being referred to in FIG. 1 in order to simplify the illustration. Each of the circles in FIG. 1 represents component part data that has been contributed to the database by a chain link manufacturer, a lubrication supplier, a gear manufacturer, a crank shaft manufacturer, and a pedal manufacturer, respectively. Although these particular components may not be easily manufactured by use of 3D printing, it is to be understood that the principles illustrated by the description below may be applied to other components that are more easily manufactured by use of 3D printing. As used herein, "component part data" may include 3D printing data for the component parts, images of the component parts, and other data describing the component parts that the particular user is capable of providing to other users of the community.

The chain link manufacturer, lubrication supplier, gear manufacturer, and crank shaft manufacturer may agree to form an exclusive group wherein each of the four members contributes data to a shared portion 10 of the database. Other users of the database who are excluded from the exclusive group, such as the pedal manufacturer, may be denied access to the shared data in database portion 10.

There may be exclusive sub-groups set up to include two or three of the members in the four-member exclusive group described above. For example, the gear manufacturer, the chain link manufacturer, and the lubrication supplier may have component part data that one or more of these three members does not wish to share with the crank shaft manufacturer. Thus, the three members may elect to form another shared portion 12 of the database that the three members all have access to, and may search, but that the crank shaft manufacturer cannot access.

Similarly, any two of the four members may form another sub-group that is accessible by only the two members. For example, the gear manufacturer and the chain link manufacturer may have component part data that one or both of these two members does not wish to share with either of the crank shaft manufacturer and the lubrication supplier. Thus, the two members may elect to form another shared portion 14 of the database that the two members both have access to, and may search, but that the crank shaft manufacturer and the lubrication supplier cannot access.

The chain link manufacturer, lubrication supplier, gear manufacturer, and crank shaft manufacturer may have an interest in forming an exclusive group because they are contractually obligated to cooperate to manufacture a drive system, for example. As another example, all four members may just have an interest in buying and/or selling their parts to each other, or buying and/or selling 3D printing data that enables a buyer to replicate the seller's part, because of an existing working relationship, or because they are familiar with each other's part quality.

The pedal manufacturer may supply pedals to the bicycle industry, and so may be interested in purchasing crank shafts from the crank shaft manufacturer, or in purchasing 3D printing data for the crank shafts and manufacturing crank shafts according to the crank shaft manufacturer's 3D printing data. The pedal manufacturer may then attach his pedals to the thusly acquired crank shafts. Thus, the pedal manufacturer and the crank shaft manufacturer may choose to form another shared portion 16 of the database that the two members both have access to, and may search, but that any other users of the database cannot access.

Figure 2:
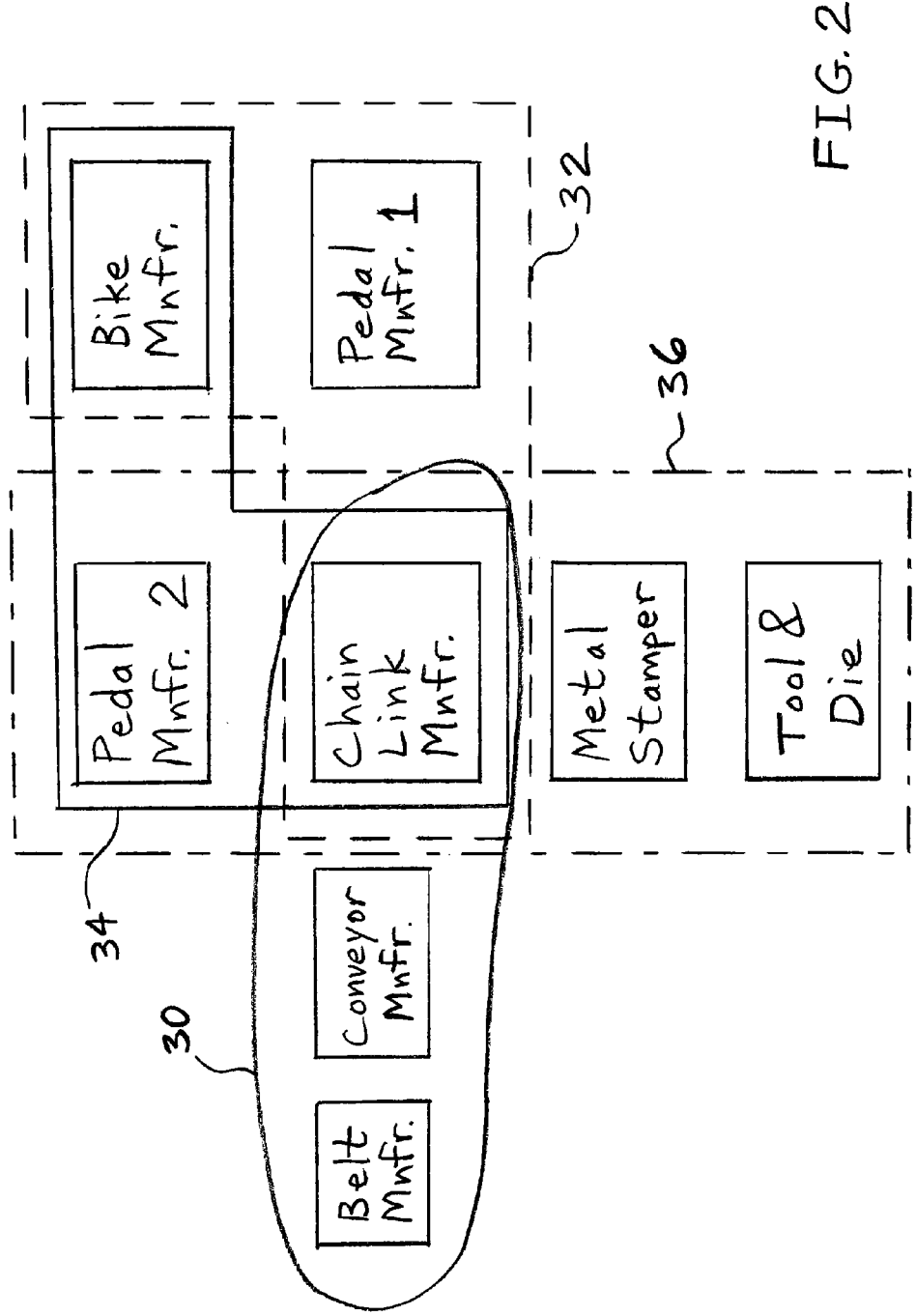
FIG. 2 is the web page of FIG. 1 with a doodled part entered into the canvas.

FIG. 2 is another diagram illustrating the forming of exclusive groups between various suppliers. The conveyor manufacturer may regularly purchase components and/or 3D printing data from the belt manufacturer and the chain link manufacturer, and thus the three entities may form an exclusive group 30.

The chain link manufacturer and a first pedal manufacturer may sell their products and/or 3D printing data to a bike manufacturer. The bike manufacturer may request or require that the three parties form an exclusive group 32 so that all three parties have access to component part data of all three parties. The bike manufacturer may produce a different set of bikes using the pedals or the pedals' associated 3D printing data sold by a second pedal manufacturer and the chain links or the chain links' associated 3D printing data provided by the chain link manufacturer. Thus, the bike manufacturer may request or require that pedal manufacturer 2 join the bike manufacturer and the chain link manufacturer in forming another exclusive group 34 so that all three of these parties have access to the component part data of each other.

The chain link manufacturer may obtain his raw materials and/or 3D printing data from a metal stamper who, in turn, uses tooling and/or 3D printing data from a tool and die provider. The chain links produced via this supply chain may be sold to a second pedal manufacturer, and thus these four entities may form an exclusive group 36.

In one embodiment, the database is maintained on a single website. When a member of one or more exclusive groups searches for a particular part, he may automatically search all of the portions of the database to which he has been given access. That is, the portions of the database that are being searched on the searcher's behalf may be transparent to the searcher. Alternatively, the searcher may conduct searches within the confines of the data available to a single exclusive group. The data associated with a combination of two or more user-selected exclusive groups may also be searched in a single search. The data available to all users may automatically be included in all searches.

In addition to buyers and sellers of component parts and of the associated 3D printing data, other parties may be included in an exclusive group as affiliate members. Such affiliate members may have circles of influence on other database users or non-database users such that their having access to the data of an exclusive group may benefit the members of the exclusive group. Such an affiliate member may be an investor, for example. Thus, an affiliate member may be a member of the exclusive group but contributes no component part data to the exclusive group's shared portion of the component part database.

Members of an exclusive group may become such by invitation of one or more of the members of the exclusive group. Each exclusive group may have a ruler or host who decides to which parties invitations are extended. The members and/or the ruler may also have the power to remove a member from the exclusive group.

A member who would like to set up an exclusive group or "community" may pay a fee to the host/operator of the database in order to do so.

Figure 3:
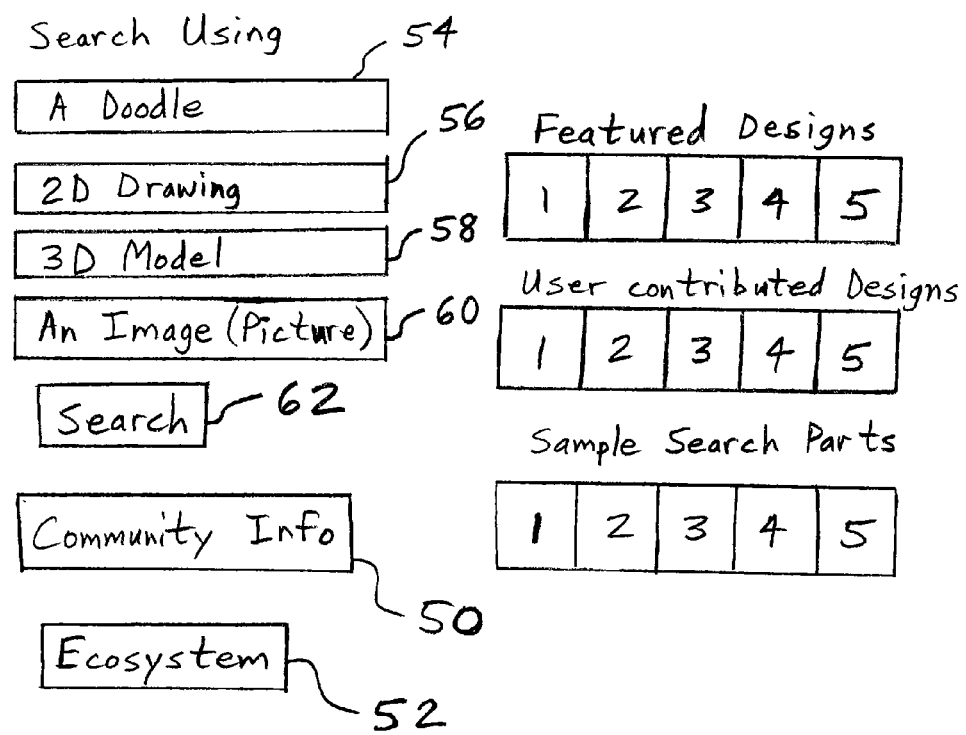
FIG. 3 is an exemplary display screen on a website that hosts a shared database system of the present invention.

A display screen from a website that hosts the shared database of the present invention is illustrated in FIG. 3. A user may click on a Community Information icon 50 to reference a list of databases or portions of a database that are available for searching on the website. The user may also click on an Ecosystem icon 52 to reference and select one or more exclusive groups of which he is a member.

After selecting a database and perhaps one or more exclusive groups whose data is to be searched, the user may select his mode of providing input for the component search. For example, the user may select one of the Doodle icon 54, the 2D Drawing icon 56, the 3D Model icon 58, or the image (picture/photograph) icon 60. After providing the input data search term in the chosen manner, the user may click on a Search icon 62 to begin the search.

Figure 4:
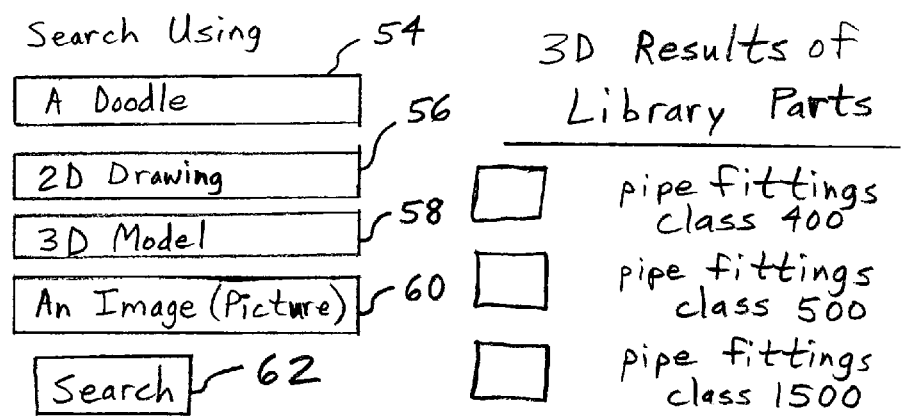
FIG. 4 is another exemplary display screen on a website that hosts a shared database system of the present invention.

As shown in the screen display of FIG. 4, the search results may be divided into two classes: 3D Results of Library Parts (parts and associated 3D printing data found in the database that may be viewed by all users), and 3D Results of User Shared Parts (parts and associated 3D printing data in the database that are provided by certain users of the database, such as members of one or more exclusive groups).

For the sake of brevity, the database may be referred to herein as storing images, image data, or 3D printing data related to the component parts. However, it is to be understood that the database may actually store the shape representations of three-dimensional models (including data which may be used in 3D printing of the parts) and two-dimensional drawings and related data, such as images for thumbnail displays and three-dimensional/two-dimensional light viewable files, e.g., i3D format, which is proprietary to Imaginestics, LLC. "Image data", as used herein, may include not just an image expressed in ones and zeros, which is a static snapshot of an object, or a representation of a component model. Rather, "image data" may incorporate a component model, which may include a plurality of two-dimensional images from different viewpoints in three-dimensional space, i.e., a three-dimensional model, as well as names/descriptors of models/parts, part numbers, and other identification and sourcing information.

A user in the form of an organization, such as a company, may designate each of its employees as being part of the "user" such that each of the employees has equal access rights to the database. Alternatively, different classifications of employees may be provided with different levels of access. For example, employees in purchasing and sales may be provided with the full access rights of the user, while employees in manufacturing may be provided with access to only the component parts and component part data that the user contributed to the database.

In another embodiment, a user may designate one or more partners that are provided with the same access rights to the database that the user is provided with. Other users who are members of the same shared portion of the database as the user may be informed of the access rights being provided to a newly added partner so that the other users may have the option of preventing the newly added partner from accessing the component parts of the other users. For example, an other user may consider the newly added partner to be a competitor of the other user, and thus may request that the newly added partner not have access to the other user's parts in the database.

The searching of the database may be performed as disclosed in U.S. Patent Application Publication No. 2004/0249809, titled METHODS, SYSTEMS, AND DATA STRUCTURES FOR PERFORMING SEARCHES ON THREE DIMENSIONAL OBJECTS, published Dec. 9, 2004, or in International Application No. PCT/US2007/062734, titled METHOD OF ENABLING A USER TO DRAW A COMPONENT PART AS INPUT FOR SEARCH- ING COMPONENT PARTS IN A DATABASE, filed Feb. 23, 2007, each of which is expressly incorporated herein by reference.

Although the present invention has been described herein as applying to a database of component parts and associated 3D printing data, in another embodiment the database includes descriptions of services that may performed on, or related to, the component parts or that may be performed independently of the component parts. For example, a user may furnish an image of a desired component part and a keyword description of a service related to the component part and may search the user's accessible portions of the database based upon the furnished image of the desired component part and the keyword description.

The component may be provided to the database by one user, and the description of the services related to the component may be provided by another user. The component and the description of the related services may be disposed in a same shared portion of the database.

In one embodiment, the user may select whether the component part or the keyword description of the service related to the component part is to be the primary search term. For example, if the component part is the primary search term, then a first part of the search process may be based on the component image alone, and the second part of the search process may include finding services related to the results of the first part of the search. Conversely, if the keyword description of the service is the primary search term, then a first part of the search process may be based on the keyword(s) alone, and the second part of the search process may include finding component parts on which the results of the first part of the search may be performed. Regardless of whether the user selects the component part or the keyword description of the service related to the component part to be the primary search term, the user may then sort the final search results in order of relevance to the component part or in order of relevance to the service description.

In another embodiment, the database includes data identifying users who are able to manufacture, 3D print, provide 3D printing data, or otherwise supply a search result item, even if the manufacturer/supplier is not the user who contributed the search result item or 3D printing data to the database. For example a first user may contribute 3D printing data for a design for a particular component to the database. A second user who is a member of the group that has access to that particular portion of the database may identify itself as a potential source of the particular component, or of 3D printing data for the particular component. Thus, when the particular component appears in search results, a link identifying the user who is the potential source of the component or its 3D printing data may appear adjacent to the component in the presentation of the search results.

The party who requested the search may click on the link identifying the user who is the potential source of the component or its 3D printing data. The party may then request a quote of how much money the source user would charge the party to supply the particular component or its 3D printing data. The party may then be prompted to answer one or more predetermined questions as inputs to the calculation of the quote. A quote may then automatically be provided to the party by the source user within a few seconds based upon a quote formula or lookup table.

In another embodiment, users may be automatically organized into groups that share respective portions of the database based upon characteristics and/or qualifications of the users. That is, at least some groups are not "manually" put together by users selecting each other individually, but rather are automatically put together based on objective criteria. For example, users may be classified or put into groups by their industry, size, or some proxy for size such as revenue, geographic location, and/or accreditations, such as those meeting ISO 9000 standards set by the international organization for standardization.

Figure 5:
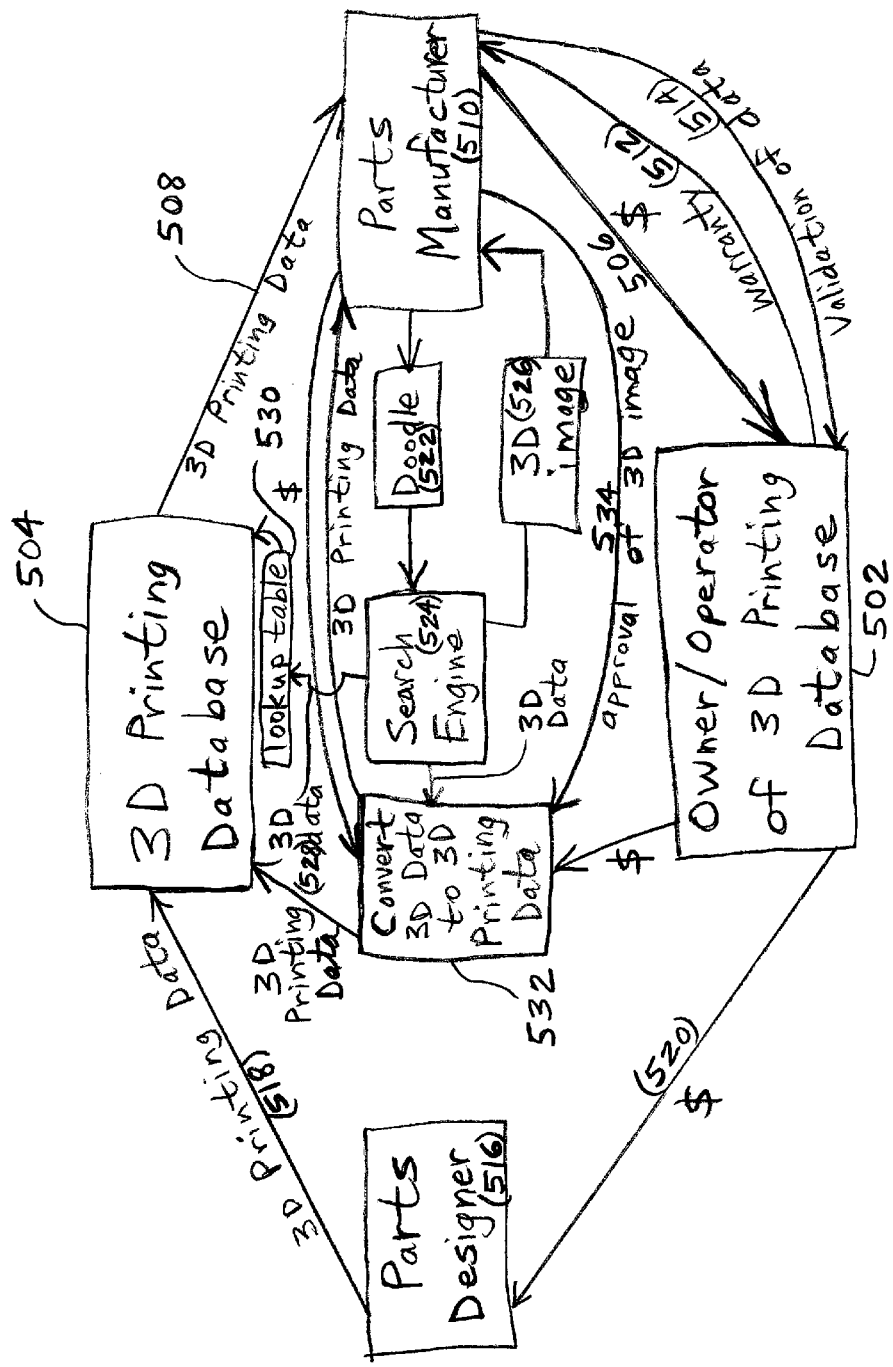
FIG. 5 is a schematic diagram of a 3D parts database system of the invention and its operation.

In another embodiment of a method 500 of operating a repository for three-dimensional printing data, shown in FIG. 5, an owner/operator 502 of a 3D printing database 504 may sell or license (e.g., receive money, as indicated at 506) 3D printing data 508 for a particular part, or for a particular type of part, to a parts manufacturer 510. The owner/operator 502 may sell a warranty 512 for the quality of the data to the manufacturer. Warranty 512 may be valid for only certain models of 3D printers that data 508 is intended for, or for only models of 3D printers that owner/operator 502 has validated as being able to handle, process and/or properly use the particular data 508 that warranty 512 covers. Conversely, the manufacturer 510 may validate 514 the data by manufacturing the part using the data, and may inform the owner/operator that parts of good quality were made by use of the data, and the owner/operator may provide warranties for the data to other manufacturers based on this validation. The owner may monetarily compensate the manufacturer for the validation service. A parts designer 516 may contribute 3D printing data 518 to the database 504, for which the owner/operator may monetarily compensate 520 the parts designer.

The parts manufacturer, who may be an organization or an individual, may provide an electronic doodle 522 of the desired part to a search engine 524 owned by the owner of the database. The search engine may search another database of image data, and return an image (e.g., 3D image 526) of a part matching the doodle, and for which 3D printing data may be retrieved from the 3D printing database, or may be newly created for that particular doodled part. The doodle provided by the manufacturer may be 2D or 3D. The doodle may include a plurality of 2D images from different viewpoints. If the manufacturer approves of the 3D image offered by the search engine, as indicated at 534, then the 3D image data may be converted into 3D printing data, as indicated in block 532. This conversion may be performed automatically by a processor operated by the owner of the databases. Alternatively, a third party, such as the parts designer, may be engaged and monetarily compensated for providing 3D printing data based on the 3D image data. The 3D printing data may then be provided to the parts manufacturer, who may pay for the data conversion in addition to paying for the 3D printing data itself, or in addition to paying for a license for the 3D printing data. Finally, the 3D printing data may be deposited in the 3D printing database for retrieval and use by other manufacturers who want to make the same part.

As an alternative to converting the 3D image data to 3D printing data, the 3D printing data may already be stored in the database in association with the 3D image data found in the search. In this case, the 3D data 528 may then be entered into a lookup table 530, which then finds in the database 504 the 3D printing data associated with the 3D image data found in the search. The found 3D printing data is then sent to the manufacturer.

The 3D printing data 508 downloaded or streamed by parts manufacturer 510 may include digital rights management (DRM) as a security function to prevent manufacturer 510 from transferring data 508 to a third party or from printing the part more than the number of times that manufacturer 510 paid for. Manufacturers of 3D printers may implement features in their printers that accommodate the DRM function of data 508.

In the event that duplicate, or substantially similar, 3D printing data 518 has been uploaded by different parts designers 516, or by a single parts designer 516, to 3D printing database 504, then a processor (not shown) connected to database 504 may detect that the duplicate, or substantially similar, 3D printing data 518 has been uploaded. The processor may then notify the parts designer(s) that uploaded the data that another set of data identical or substantially similar data has also been uploaded. The true owner of the data may thus be notified that another party is in possession of its data.

While this invention has been described as having an exemplary design, the present invention may be further modified within the spirit and scope of this disclosure. This application is therefore intended to cover any variations, uses, or adaptations of the invention using its general principles.

What is claimed is:

1. A method of providing a searchable database, the method comprising:
    collecting three-dimensional (3D) printing data associated with component parts and services related to the component parts from a plurality of users to form a database;
    forming a first exclusive group including a first subset of the plurality of users;
    providing users who are members of the first exclusive group with access to a first portion and to other portions of the database, the first portion being contributed to the database by the users who are the members of the first exclusive group;
    denying to users excluded from the first exclusive group access to the first portion of the database;
    providing the users excluded from the exclusive group with access to the other portions of the database;
    forming a second exclusive group including a second subset of the plurality of users, the second subset including at least one but not all members of the first subset and at least one but not all of the users excluded from the first subset;
    providing users who are members of the second exclusive group with access to a second portion of the database, the second portion being contributed to the database by the users who are the members of the second exclusive group; and
    denying to users excluded from the second exclusive group access to the second portion of the database;
    providing the users excluded from the second exclusive group with access to the other portions of the database; and
    enabling each user of the database to:
        furnish an image of a desired component part and a keyword description of a service related to the desired component part;
        select one of the desired component part and the keyword description to be a primary search term and the other to be a secondary search term: and
        search only accessible portions of the database to which the user has been provided access, wherein the searching being based upon the furnished image of the desired component part and the keyword description of the related service and being dependent upon the selection of the primary search term and the secondary search term.

2. The method of claim 1, wherein the first and second exclusive groups are automatically formed based upon objective characteristics of the plurality of users.

3. The method of claim 1, further comprising steps of:
    using a search engine to find 3D image data matching the furnished image; and
    converting the 3D image data to 3D printing data.

4. The method of claim 1, further comprising steps of:
    using a search engine to find 3D image data matching the furnished image; and
    finding in the database 3D printing data stored in association with the 3D image data.

5. A method of providing a searchable database, the method comprising:
    collecting three-dimensional (3D) printing data associated with component parts and services related to the component parts from a plurality of users to form a database;
    forming a first exclusive group including a first subset of the plurality of users;
    providing users who are members of the first exclusive group with access to a first portion and to other portions of the database, the first portion being contributed to the database by the users who are the members of the first exclusive group;
    denying to users excluded from the first exclusive group access to the first portion of the database;
    providing the users excluded from the exclusive group with access to the other portions of the database;
    enabling each user of the database to furnish an image of a desired component part and a keyword description of a service related to the desired component part and to search only accessible portions of the database to which the user has been provided access, wherein the searching being based upon the furnished image of the desired component part and the keyword description;
    a searching user selecting whether the image of the desired component part or the keyword description of the service shall be a primary search term; and
    the searching user selecting whether search results are presented in order of relevance to the image of the desired component part or to the description of services.

6. The method of claim 5, further comprising steps of:
    segregating the search results into data from the users who are the members of the first exclusive group and data from the users excluded from the first exclusive group; and
    presenting the segregated search results.

7. The method of claim 5, further comprising selecting whether the image of the desired component part is presented as a doodle, a two-dimensional drawing, a three-dimensional model, or a photograph.

8. The method of claim 5, further comprising selecting a portion of the database to be searched.

9. The method of claim 5, wherein at least one user who is a member of the first exclusive group contributes no data to the first portion of the database.

10. The method of claim 5, further comprising providing a partner of one particular user of the database with access to the database equivalent to the one particular user's access to the database.

* * * * *